Patented May 8, 1934

1,958,397

UNITED STATES PATENT OFFICE

1,958,397

PROCESS AND COMPOSITION OF MATTER OF PROTECTING AND COLORING CONCRETE

Edward W. Scripture, Jr., Cleveland Heights, Ohio, assignor to The Master Builders Company, Cleveland, Ohio, a corporation of Ohio No Drawing. Application July 27, 1931, Serial No. 553,385

11 Claims. (Cl. 91—68)

This invention relates to the production of structures of concrete and artificial stone, and has particular reference to floors, walls, piers, walks, roadways and the like, although applicable to all structures made from Portland or hydraulic cement. The objects of the invention are the provision of simple and inexpensive means for preventing efflorescence without impeding the curing of the structure or injuring its surface appearance; the provision of a process for preventing efflorescence during curing which is capable of being made the first step in the provision of a stain-proof coating after curing is complete; and the provision of a composition of matter applicable after setting for preventing injury to the surface of the concrete either during or after the curing.

This invention also relates to the coloring and surface treatment of concrete or cement structures, primarily floors or platforms, either those having a coloring material incorporated therein or those made without color; and a further object of my invention is the provision of a new and improved composition of matter applicable to the concrete soon after its setting, and in advance of its drying, which shall, in addition to the coloring effect ultimately desired, afford a substantial degree of protection of the concrete against staining or disfigurement by subsequent trades.

Efflorescence as encountered in concrete work consists of the formation of hard accretions on the surface of the structure due to the leaching out of soluble materials from the interior of the structure by the escape of excess water therefrom, the soluble materials thus translocated becoming carbonated on contact with the outer air and thus rendered insoluble. In the construction of many types of structures, such as floors in office buildings, it is necessary that practically all the free water be eliminated before the final surfacing (of paint or wax etc.) can be applied and it is this coming out of the water-borne soluble salts, which are deposited on the concrete by the evaporation of the water, which produces the efflorescence in question. It has been suggested that evaporation of the water be entirely prevented, but this is not a solution of the problem, since the liquid must be eliminated at some time, and whenever its escape is finally permitted the dissolved salts will be released and some provision must be made for getting rid of them.

According to my invention, instead of preventing the escape and evaporation of the liquid, I permit such escape and evaporation but provide, for the reception of the crystallized salts thereby deposited, a layer of material to which these salts will not adhere and which will also prevent their adhering to the surface of the concrete. Such a layer is that exhibited by a porous coating or covering of wax; and to produce such a coating or covering I apply to the surface of the concrete, before any substantial amount of soluble material has been drawn to such surface, an emulsion of wax in water. When the excess of this water has evaporated a thin pervious coating of wax is deposited on the concrete surface which allows the ready escape of water outwardly from the concrete while preventing contact between the deposited solutes and the concrete surface. The reason for this is that evaporation only occurs where this liquid contacts with the air, which, by reason of this wax coating, is at the upper surface of the wax so that the dissolved materials, mostly lime salts, instead of becoming attached to the concrete as a hard, stony mass are deposited on the wax as a loose, scaly or friable coating which can readily be brushed away. After escape of the water so that the concrete is sufficiently dry the surface is swept carefully so as to remove any of these salts together with any dust, chips, and litter left by other trades, and the remainder of the wax layer is burnished so as to render it impervious to subsequent staining or discoloration from above. It is, of course, possible to add more wax for this purpose, which, indeed, is often done, but it is a substantial advantage of my process that the original wax layer does not require to be removed but takes a helpful part in the final finishing of the surface. Preferably this wax and water emulsion is not applied to the concrete until after it has become completely set. An example of a successful procedure is as follows: one (1) pound of carnauba wax is made into an emulsion with one (1) gallon of water. This may be effected by heating the wax and water to a temperature of 90 degrees centigrade and beating them intimately together in the presence of an emulsifying agent such as ammonium linoleate. The cooled mixture is then applied to the concrete which is already "set" at the rate of one (1) gallon per 600 square feet (more or less as the case may be). So far as concerns merely the protection from efflorescence, any soft adherent coating substance may be used which is porous enough to allow the escape of the water while sufficiently friable, soft, or removable to prevent any permanent adhesion of the deposits to the concrete but I prefer the wax because of its double utility. For example, a solution of a water soluble resin or gum may be applied to the concrete and removed subsequently by washing.

The Kaufman Patent 1,515,121 describes the use of a wax dissolved in a water-free volatile vehicle. The process and composition of matter therein described are very successful and produce colors of great beauty, but entail the disadvantage of being restricted to use with dry or nearly dry concrete, which means: that its application is never possible until after the curing has become complete, and sufficient time thereafter allowed to enable the necessary reduction of the water content (which in some places such as basements may never occur); and that the concrete must during the intervening period be protected in some other manner from staining or disfigurement by other trades such as the plumbers and steam fitters with their oils and greases, and the painters with their oils and pigments. Owing to its porosity concrete is very easy to soil and very hard to clean, but by the same token, if it can be impregnated at the very start with the desired color, the presence of the vehicle by which that color is carried is an assistance in rejecting other colors and stains.

Accordingly the present invention may in certain respects be looked upon as an improvement on the Kaufman patent and on the procedure described in the Kaufman patent enabling the protective and coloring material to be applied immediately upon the setting of the concrete and regardless of its condition of wetness and previous to its subjection to other trades.

My improved composition of matter for the coloring of concrete consists essentially of the water emulsion of a wax colored with a permanently held insoluble pigment. Any natural or synthetic wax can be employed, for example carnauba wax, ceresin, paraffin, bees-wax, etc. Light colored waxes are of chief value since black waxes, of which great numbers are known, are not susceptible to pigments, and give muddy or dull colors except in the case of blacks and grays. Insoluble pigments are used because of their greater hiding power. Examples of satisfactory pigments are the oxides of iron, chromium, manganese, etc., carbon-black; organic lakes (namely inert materials like clay or other minerals colored by impregnation or precipitation with dyes); insoluble pigment dye stuffs (for example a precipitate formed by mixing a basic dye with an acid dye); also lead-chromate, Prussian-blue, vermilion, and in fact any known or desired insoluble coloring matter. The intrinsic value of the pigment is of comparatively small importance since the preferred mode of dissemination in the wax, and the very great spreading power thereby secured, reduces the material cost to a minor factor. It is important, however, that the mixture of the pigment with the wax be one which will not become segregated. One especially effective mode of effecting this mixture is that of passing the pigment and the emulsion through what is known as a "colloid mill" which is a dispersing device that in addition to separating discrete particles from each other (with or without grinding) imparts to most of those particles an electro-static charge relative to the liquid medium in which the dispersion occurs.

A preferred procedure is as follows: the wax is first melted, an emulsifying agent is added, and the whole is mixed with hot water under constant stirring. Examples of successful emulsifying agents are ammonium linoleate, trihydroxyethylamine linoleate, or potassium abietate. These are well known emulsifying agents and many others are known, and this emulsifying step is a perfectly well known procedure.

The emulsion is mixed with the pigment and the whole passed through the colloid mill, numerous examples of which are already known and obtainable on the market under that name. They are distinguished from other mills primarily by reason of their very great speed of rotation, coupled generally with a comparatively slow speed of material progress. The proportions of the different ingredients employed may be in a satisfactory proportion of wax and water, one pound to one gallon. A satisfactory average proportion of pigment to emulsion is perhaps one-eighth pound of pigment per gallon, although this varies widely according to the density and color of the pigment and the ultimate color desired. Thus if carbon-black be used, which is light in weight and of high coloring power, the proportion would be very much smaller, perhaps one-half ounce per gallon more or less; while a heavier pigment such as iron oxide may require as much as one-fourth pound per gallon or more depending on the color desired.

It is not always necessary to emulsify before dispersion of pigment; it is sometimes possible to reverse the order of steps more or less completely, but success with the preferred order of steps is easy and uniform while success with any reversed order is less easy and more uncertain.

This material when made as directed can be packaged in cans and shipped and stored without deterioration. It is applied with brushes after the manner of paint, preferably as soon as the setting of the concrete will bear the workmen's weight. The greater portion of the mixture disappears partly by direct evaporation and partly by absorption into the concrete leaving the wax portion in the form of a thin pervious coating, some of the wax being carried into the pores of the concrete with the water which is absorbed and some of it being left on top of the concrete as a more or less incoherent layer which itself constitutes a coating or protective layer, preferably it is immediately supplemented by a coating of builders' paper to absorb stains. It is not necessary nor even desirable to employ impervious paper, varnished, or paraffined, or asphalted, as has sometimes been done in connection with concrete for the purpose of preventing the evaporation of the liquid and thereby improving the cure. The sole purpose of the paper is to increase the protection against subsequent trades, although this paper alone, being merely laid in place and being itself easily torn and displaced, is not completely effective. The porous nature of the wax layer permits the gradual escape of the water from the floor, and while traffic on the floor during this curing period tends gradually to densify and incorporate the wax, still the porosity remains sufficient to enable the eventual drying providing that the paper used be not too impervious. At the end of the operation, and after the other trades have gone, the paper is removed, or what is left of it, and the floor fairly swept dry. Due to the wax little discoloration or stain will be found to have been received, and while some of the wax is usually removed by this sweeping, enough generally remains to afford substantial assistance to the polish. More wax can be applied at this time, either dry or dispersed in water; and such newly applied wax may either be clear or colored.

The procedure of applying and removing the wax herein described is essentially that set forth in my application filed April 10, 1931, Serial Number 529,313, of which the present application is a continuation in part. One of the advantages of my present invention is that defective portions of a concrete floor are likely to be of a lighter color and more porous texture than other portions; so that by applying a colored emulsion as herein described a tendency exists to even up the floor and render its color more nearly uniform since the porous defective portions absorb more of the pigmented wax than do the remaining portions. Many other advantages of my improved procedure and composition of matter exist, and many changes can be made in detail and I do not limit myself in any wise except as specifically recited in my claims.

Having thus described my invention what I claim is:

1. The process of protecting a freshly set concrete structure against staining and disfigurement, and of improving its final appearance, which contains the step of applying to the surface of said concrete the water emulsion of a wax colored with a finely divided insoluble pigment.

2. The process of coloring and finishing the exposed surfaces of cement and concrete structures, which comprises the step of applying to the surface thereof after the same has taken its final set but before any substantial amount of soluble material has been drawn to such surface, an emulsion of colored wax in water, and allowing evaporation of such water, whereby a thin pervious colored coating of wax is deposited on said surface which allows the escape of water outwardly from the concrete while preventing contact between discoloring materials and the colored concrete surface.

3. The process of coloring and finishing the exposed surfaces of cement and concrete structures which comprises the step of applying to the surface thereof before any substantial amount of soluble material has been drawn to such surface, an adherent layer of pervious colored organic material through which the water of the concrete can pass and become evaporated and to which materials precipitated and deposited on such surface will not adhere.

4. The process of coloring and finishing the exposed surfaces of a concrete structure which comprises the step of applying to the surface of said structure before any substantial amount of soluble material has been drawn to such surface, an emulsion of colored wax and water, allowing the evaporation of such water whereby a thin pervious coating of colored wax is deposited on such surface, allowing the structure to become dried through said wax, removing all the materials deposited on said wax, and finally polishing and burnishing said wax.

5. The process of coloring and finishing the exposed surfaces of cement and concrete structures which comprises the step of applying to the surface thereof before any substantial amount of soluble material has been drawn to such surface, a suspension in water of a colored organic substance which is adapted upon evaporation of such water to produce a porous adherent colored layer, allowing evaporation of such water and the drying out of the concrete beneath the porous layer so formed, and finally removing all the accumulations of material thereon.

6. The process of coloring and finishing the exposed surfaces of cement and concrete structures which comprises the step of applying to the surface thereof before any substantial amount of soluble material has been drawn to such surface, a suspension of finely divided colored organic material in water, said suspension including a sticky ingredient, and then allowing the evaporation of the water portion of said suspension until the suspended material has produced a colored superficial pervious layer over the surface and thereafter until the water has dried out of the structure beneath, and finally removing at least the superficial portion of said colored layer.

7. The process of preventing the growth of adherent efflorescence on structures of cement and concrete, which contains the step of applying to the surface thereof after the same has taken its final set but before any substantial amount of soluble material has been drawn to such surface, an emulsion of colored wax in water, and allowing the evaporation of such water, whereby a thin pervious coating of wax is deposited on said surface which allows the escape of water outwardly from the concrete while preventing contact between deposited salts and the concrete surface.

8. The process of preventing the growth of adherent efflorescence on structures of cement and concrete, which contains the step of applying to the surface thereof before any substantial amount of soluble material has been drawn to such surface, an adherent layer of pervious organic material through which the water in the concrete can pass and become evaporated and to which minerals deposited from such water do not adhere.

9. The process of producing a concrete structure of improved appearance which contains the step of applying to the surface of said structure before any substantial amount of soluble material has been drawn to such surface, an emulsion of wax in water, allowing the evaporation of such water whereby a thin pervious coating of wax is deposited on said surface, allowing the structure to become dried through said wax, sweeping away all minerals deposited on said wax, and finally polishing and burnishing said wax.

10. The process of preventing efflorescence on the surface of a concrete structure which contains the step of applying to the surface of said structure before any substantial amount of soluble material has been drawn to such surface a suspension in water of an organic substance which is adapted, upon the evaporation of such water to produce a porous adherent layer, allowing the evaporation of such water and the drying out of the concrete beneath the porous layer so formed, and finally sweeping away all accumulations of mineral thereon.

11. The process of preventing efflorescence on the surface of a concrete structure which contains the step of applying to the surface of said structure before any substantial amount of soluble material has been drawn to such surface a suspension of finely divided organic material in water, said suspension including a sticky ingredient, and then allowing the evaporation of the water portion of said suspension until the suspended material has produced a superficial pervious layer over such surface and thereafter until the water has dried out of the structure beneath, and finally sweeping away at least the superficial portion of said layer.

EDWARD W. SCRIPTURE, JR.